(12) United States Patent
Tokuyama et al.

(10) Patent No.: US 8,934,148 B2
(45) Date of Patent: Jan. 13, 2015

(54) IMAGE READING APPARATUS

(71) Applicant: Canon Kabushiki Kaisha, Tokyo (JP)

(72) Inventors: Kaneto Tokuyama, Tokyo (JP);
Kazuyuki Morinaga, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/918,140

(22) Filed: Jun. 14, 2013

(65) Prior Publication Data

US 2014/0022613 A1    Jan. 23, 2014

(30) Foreign Application Priority Data

Jul. 20, 2012 (JP) ................................. 2012-161960

(51) Int. Cl.
| | | |
|---|---|---|
| *H04N 1/04* | (2006.01) | |
| *H04N 1/10* | (2006.01) | |
| *H04N 1/12* | (2006.01) | |
| *H04N 1/193* | (2006.01) | |

(52) U.S. Cl.
CPC ............ H04N 1/1008 (2013.01); H04N 1/1039 (2013.01); H04N 1/0464 (2013.01); H04N 1/1017 (2013.01); H04N 1/121 (2013.01); H04N 1/193 (2013.01); H04N 2201/0081 (2013.01); H04N 2201/0094 (2013.01)
USPC ........ 358/474; 358/497; 358/496; 271/10.01; 271/162; 399/367

(58) Field of Classification Search
CPC ........ B41J 29/38; B41J 2/16547; B41J 29/02; B41J 2/16511; B41J 11/002; B41J 11/04; B41J 13/106; B41J 13/12; B41J 15/042; B41J 23/02; B41J 2/1652; B41J 2/16532; B41J 2/16535; B41J 2/16544; H04N 1/121; H04N 2201/04729; H04N 2201/04791; H04N 1/0057

USPC ........... 358/498, 497, 504, 1.1, 1.5, 461, 474, 358/482, 494, 496, 509; 271/10.01, 4.08, 271/10.09, 117, 162, 163, 18, 207, 225, 271/264, 265.01, 265.04, 3.14, 3.16; 399/367, 374, 388, 407
See application file for complete search history.

(56) References Cited

U.S. PATENT DOCUMENTS 4,411,514 A * 10/1983 Komori et al. .................. 399/43
4,953,037 A * 8/1990 Ito et al. ......................... 358/496

(Continued)

FOREIGN PATENT DOCUMENTS

| JP | 01-266529 | 10/1989 |
|---|---|---|
| JP | 3810643 B | 8/2006 |

OTHER PUBLICATIONS

U.S. Appl. No. 13/918,089, filed Jun. 14, 2013.

*Primary Examiner* — Negussie Worku
(74) *Attorney, Agent, or Firm* — Fitzpatrick, Cella, Harper & Scinto

(57) ABSTRACT

An image reading apparatus comprises a reading unit including a movable sensor, a first reading mechanism which moves the reading unit to read an original placed on a platen, a second reading mechanism which conveys the original relative to the reading unit to read the original, a common driving source which drives the first reading mechanism and the second reading mechanism, a transfer unit which transfers a driving force from the driving source to the first reading mechanism and the second reading mechanism, and a switching unit which switches rotation used to drive the second reading mechanism to one of forward rotation and reverse rotation with respect to rotation of the driving source in one direction, the switching unit operating as the reading unit moves.

10 Claims, 10 Drawing Sheets

(56) References Cited

U.S. PATENT DOCUMENTS

| | | | |
|---|---|---|---|
| 5,058,874 A * | 10/1991 | Miyoshi et al. | 271/4.1 |
| 5,099,278 A * | 3/1992 | Sato | 399/75 |
| 5,506,658 A * | 4/1996 | Takemura et al. | 399/21 |
| 5,610,731 A * | 3/1997 | Itoh | 358/496 |
| 5,862,446 A * | 1/1999 | Hashizume et al. | 399/367 |
| 6,801,344 B2 | 10/2004 | Morinaga et al. | 358/474 |
| 7,088,475 B1 | 8/2006 | Terashima et al. | 358/448 |
| 7,242,901 B2 * | 7/2007 | Oya et al. | 399/374 |
| 7,664,426 B2 * | 2/2010 | Nishimura et al. | 399/109 |
| 7,755,812 B2 * | 7/2010 | Oshida et al. | 358/496 |
| 8,072,653 B2 | 12/2011 | Iwata et al. | 358/474 |
| 8,253,995 B2 * | 8/2012 | Mizutani | 358/498 |
| 8,259,366 B2 * | 9/2012 | Hayakawa et al. | 358/497 |
| 8,636,275 B2 * | 1/2014 | Kambayashi et al. | 271/3.17 |
| 8,804,211 B2 * | 8/2014 | Morinaga et al. | 358/497 |
| 2002/0131092 A1 | 9/2002 | Tanaka et al. | 358/474 |
| 2008/0266614 A1 * | 10/2008 | Doan et al. | 358/474 |

* cited by examiner

IMAGE READING APPARATUS

BACKGROUND OF THE INVENTION

1. Field of the Invention

The present invention relates to an image reading apparatus.

2. Description of the Related Art

As one type of original document reading apparatus such as a copying machine, an original document reading apparatus which can select two original document reading modes has been known. The first original document reading mode is stationary original document reading by a flatbed scanner (FBS) which reads an original document, placed on a platen, while moving a reading sensor disposed below the original document. The second original document reading mode is conveyed original document reading in which an original document is read upon being automatically fed by an automatic document feeder (ADF) while a reading sensor is kept stopped at a predetermined position.

An original document reading apparatus of this type includes a main body unit, and an opening/closing unit rotatably supported by the main body unit. The main body unit includes a platen and reading sensor. The opening/closing unit includes a pressure plate and ADF, and opens/closes the platen. US-2008-0266614 discloses an apparatus equipped with a transfer unit which transfers the driving force of a driving source, provided in a main body unit, to the ADF in order to reduce the number of driving sources unique to the ADF so as to keep the apparatus cost low.

In the apparatus described US-2008-0266614, a reading unit which is rectilinearly movable by means of a rack and pinion gear meshes with a second pinion gear disposed at the end of the rack to drive an original document conveyance system. However, a motor is driven in only one direction in original document conveyance, and cannot be driven in a direction opposite to the former. That is, when an original document conveyance driving system is driven in a direction opposite to that in original document conveyance, driving transfer to the original document conveyance system is interrupted, thus changing the original document reading mode to the FB (flatbed) mode. When motor driving of an original document conveyance device is done in only one direction, the initialization operation of the conveyance device, the restoration operation after original document jam processing, and reverse rotation sheet feed which allows original document skew correction (registration) are impossible. Other constraints that, for example, reverse rotation for turning an original document in double-sided reading are imposed. It is therefore inevitable to lower the performance of products by, for example, omission of some functions.

SUMMARY OF THE INVENTION

The present invention has been made in consideration of the above-mentioned problem, and provides an image reading apparatus which uses a motor commonly to the ADF and FB modes, and can drive a motor to rotate it in either of the forward and reverse directions, while avoiding an increase in cost.

According to the present invention, there is provided an image reading apparatus comprising: a reading unit including a movable sensor; a first reading mechanism which moves the reading unit to read an original placed on a platen; a second reading mechanism which conveys the original relative to the reading unit to read the original; a common driving source which drives the first reading mechanism and the second reading mechanism; a transfer unit which transfers a driving force from the driving source to the first reading mechanism and the second reading mechanism; and a switching unit which switches rotation used to drive the second reading mechanism to one of forward rotation and reverse rotation with respect to rotation of the driving source in one direction, the switching unit operating as the reading unit moves.

Further features of the present invention will become apparent from the following description of exemplary embodiments with reference to the attached drawings.

DESCRIPTION OF THE EMBODIMENTS

An embodiment of the present invention will be described in detail below with reference to the accompanying drawings.

An image reading apparatus according to an embodiment of the present invention is applicable not only to a stand-alone scanner apparatus including a reading unit which reads an original document, but also, for example, a multifunction peripheral (so-called MFP) including the function of a printer.

The image reading apparatus includes a reading unit including a sensor which reads an original document (original sheet) placed on a platen, an original document conveyance unit which conveys the original document, and an original document mounting unit on which the original document is placed and held stationary. The image reading apparatus can switch the original document reading mode to one of the following two modes so as to read an original document in the selected mode as needed. One mode is a conveyed original document reading mode (to be referred to as the ADF mode hereinafter) in which the reading unit is stationary, and an original document is read while being conveyed by the original document conveyance unit (to be referred to as the ADF hereinafter). Another mode is a stationary original document reading mode (to be referred to as the FB mode hereinafter) in which an original document is placed and held stationary on the original document mounting unit (to be referred to as the FB hereinafter) on a platen glass, and read while moving the reading unit.

The above-mentioned original document conveyance unit includes a separation unit which separates a plurality of original documents one by one, and can automatically read a large number of sheet original documents at once by selecting the ADF mode. The original document conveyance unit includes an original document reversing mechanism, and allows automatic double-sided reading of an original document. Also, image reading of an original document, such as a thick original document, a book, or a three-dimensional object, that is hard to convey by the original document conveyance unit can be done by selecting the FB mode. Moreover, even a sheet original document, such as a thin breakable object or an indefinite-shaped object, can be read by selecting the FB mode.

Figure 1A:
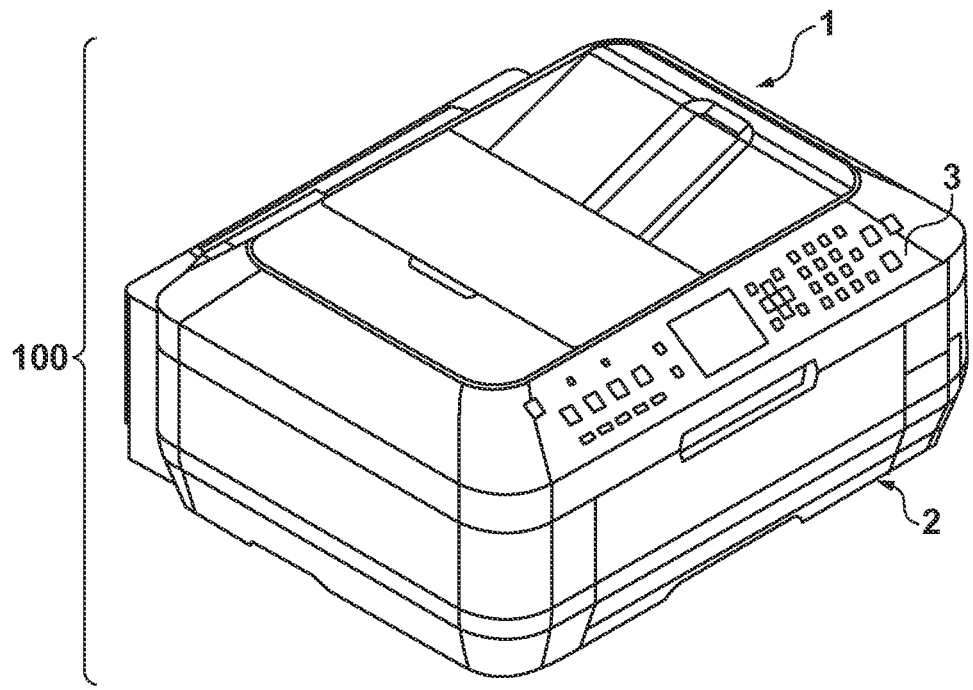
FIGS. 1A and 1B are perspective views showing a multi-function peripheral including an image reading apparatus according to an embodiment of the present invention.
Figure 1B:
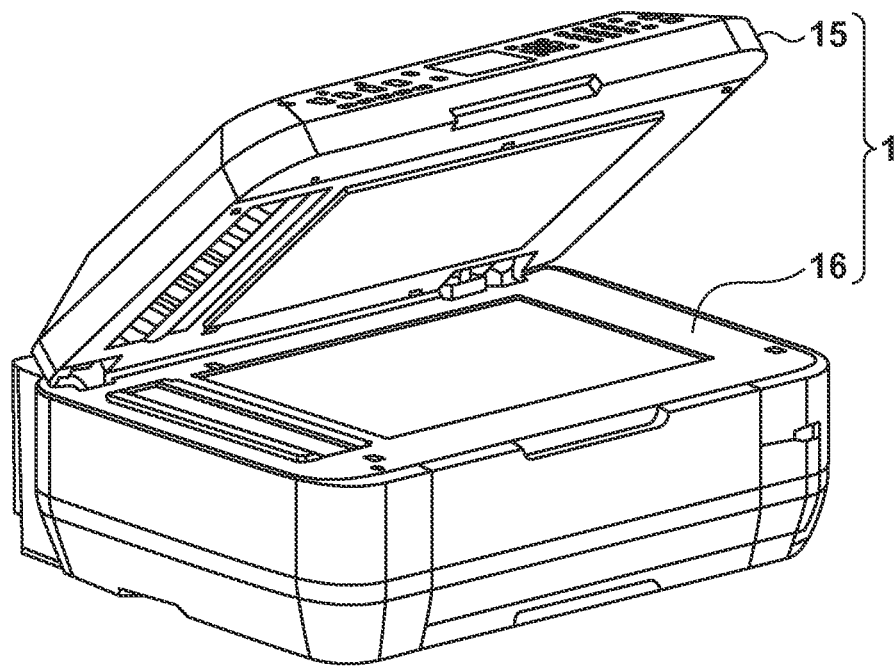

FIGS. 1A and 1B are perspective views showing an entire multifunction peripheral 100 equipped with an image reading apparatus according to this embodiment. Referring to FIG. 1A, reference numeral 1 denotes an image reading apparatus; and 2, an image output device. As shown in FIG. 1B, the image reading apparatus 1 includes an ADF unit 15 (second reading mechanism) serving as an original document conveyance unit, and an FB unit 16 (first reading mechanism) serving as an original document mounting unit, and the ADF unit 15 is disposed on the FB unit 16 and supported to be openable/closable by a hinge (not shown). Although the image reading apparatus 1 and image output device 2 are used in combination in this embodiment, the use of only the image reading apparatus 1 does not depart from the scope of the present invention. Reference numeral 3 denotes an operation unit including various keys and a display portion for operating the multifunction peripheral 100.

Figure 2:
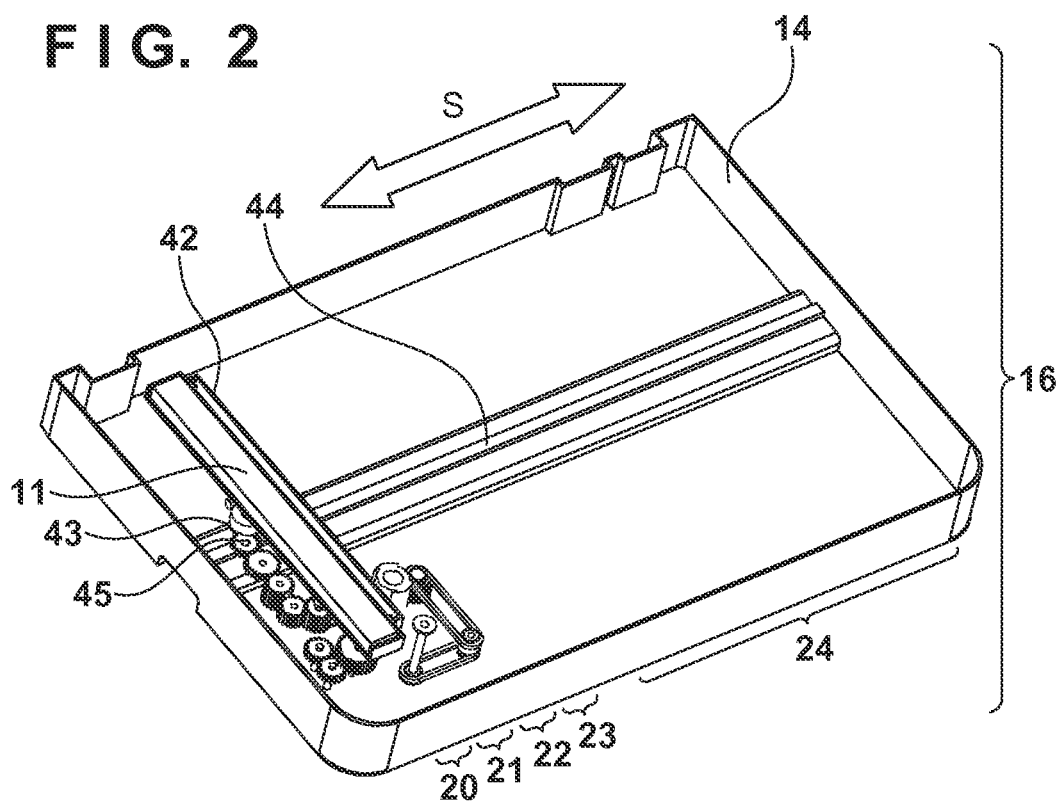
FIG. 2 is a view showing the moving configuration of a reading unit.
Figure 3:
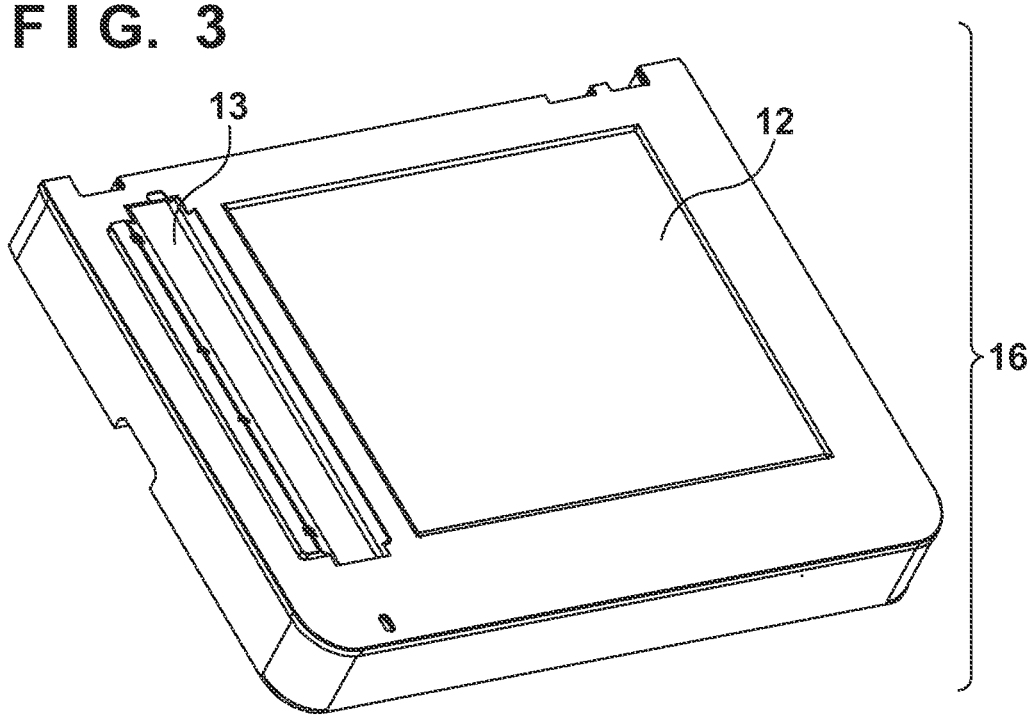
FIG. 3 is a view showing the configuration of an FB unit.
Figure 4:
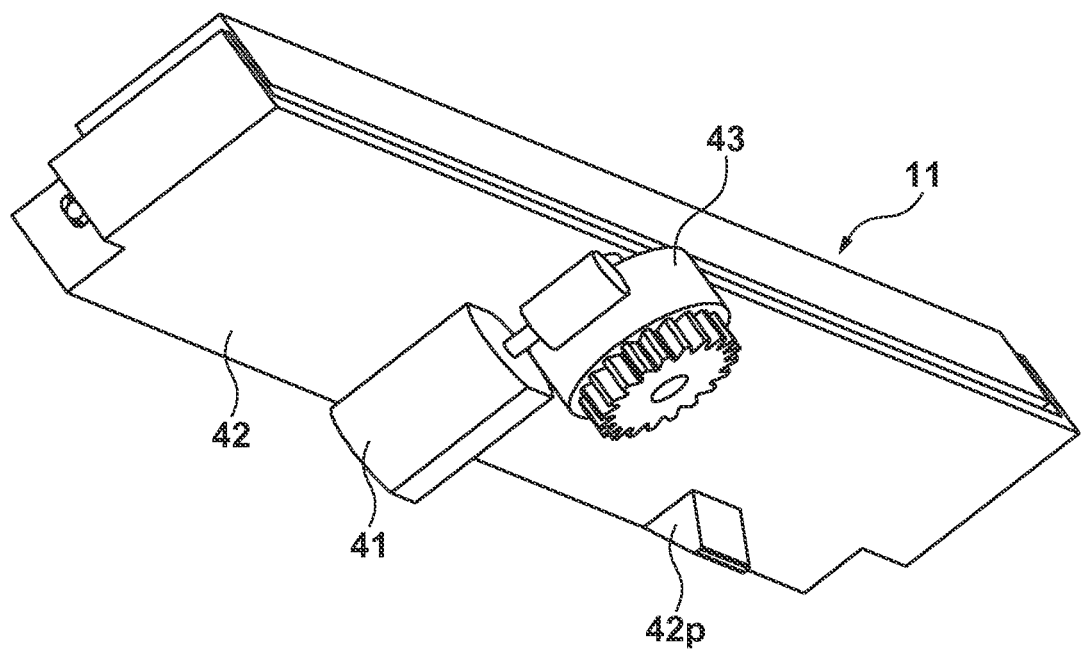
FIG. 4 is a view showing a driving system for the reading unit.

FIG. 2 shows the moving configuration of the reading unit, FIG. 3 shows the configuration of the FB unit, and FIG. 4 shows a driving system for the reading unit. Referring to FIGS. 2, 3, and 4, reference numeral 11 denotes a reading unit, which includes a line sensor (image sensor) for reading an image of an original document. The reading unit 11 can reciprocate in a direction indicated by a double-headed arrow S in FIG. 2. Reference numeral 12 denotes a platen glass (transparent plate) serving as a platen provided in the FB unit. In the FB mode, the reading unit 11 reads an image of an original document, placed and held stationary on the upper surface of the platen glass 12, while moving on the lower surface side of the platen glass 12. Also, reference numeral 13 denotes an ADF glass provided in the FB unit 16. In the ADF mode, the reading unit 11 is held stationary on the lower surface side of the ADF glass 13, and the ADF unit 15 reads an image of an original document conveyed on the upper surface of the ADF glass 13. The position of the reading unit 11 in this state will be referred to as an ADF position 20 hereinafter.

Referring to FIG. 4, a motor 41 is disposed on a carrier 42 which holds the reading unit 11, and meshes with a pinion gear 43 axially supported by the carrier 42. The motor 41 is a single driving source which is provided commonly to the ADF unit 15 and FB unit 16 and drives them. Reference numeral 44 denotes a rail rack which meshes with the pinion gear 43, and allows reciprocal movement of the carrier 42 along the rail rack 44, that is, movement of the reading unit 11 as the pinion gear 43 rotates in accordance with forward/reverse driving of the motor 41. Also, the rail rack 44 extends in the direction indicated by the double-headed arrow S in FIG. 2 from the ADF position 20, and is configured to allow the reading unit 11 to reciprocate.

Figure 5:
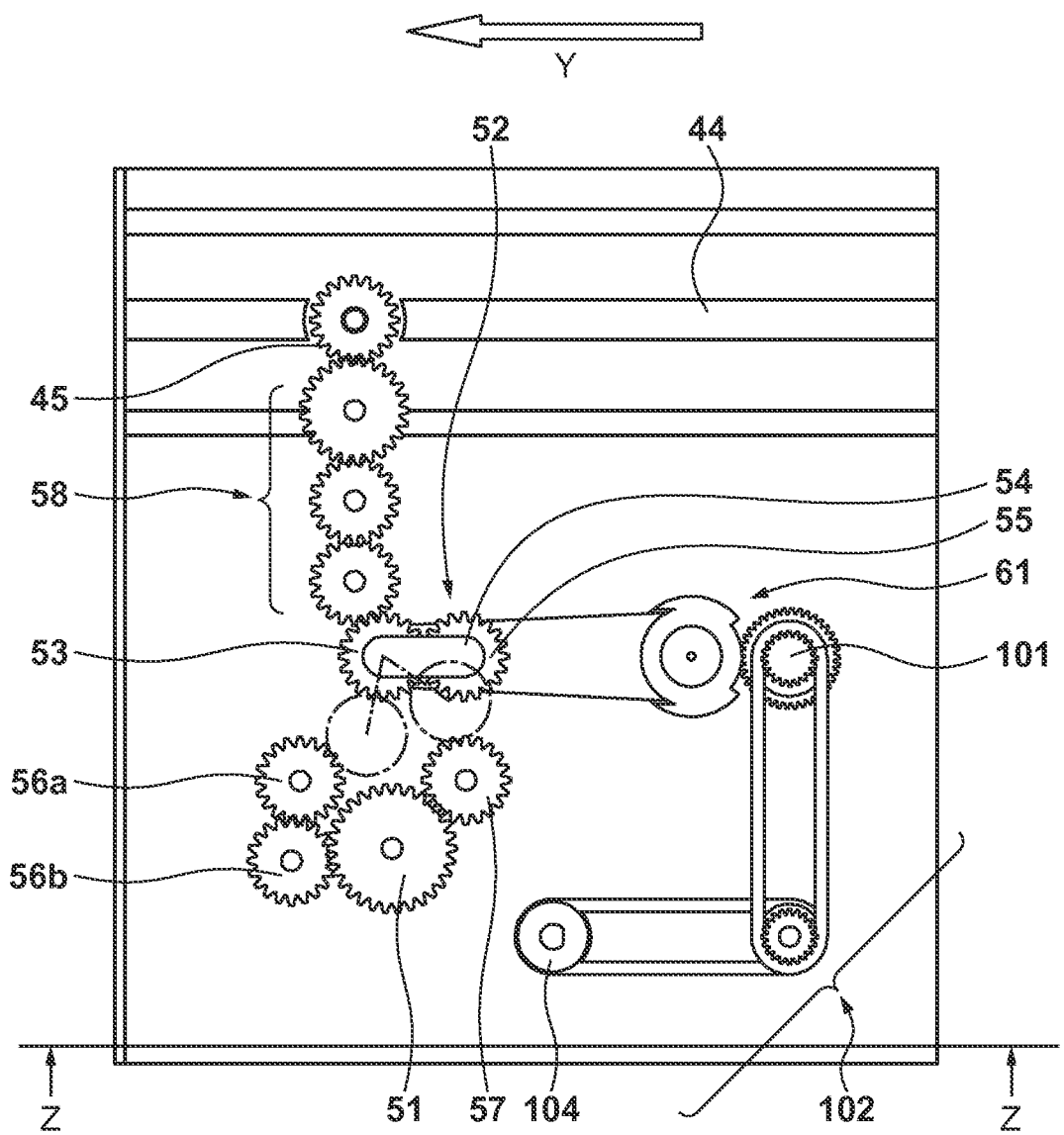
FIG. 5 is a view showing a driving system of ADF driving in the image reading apparatus.
Figure 6:
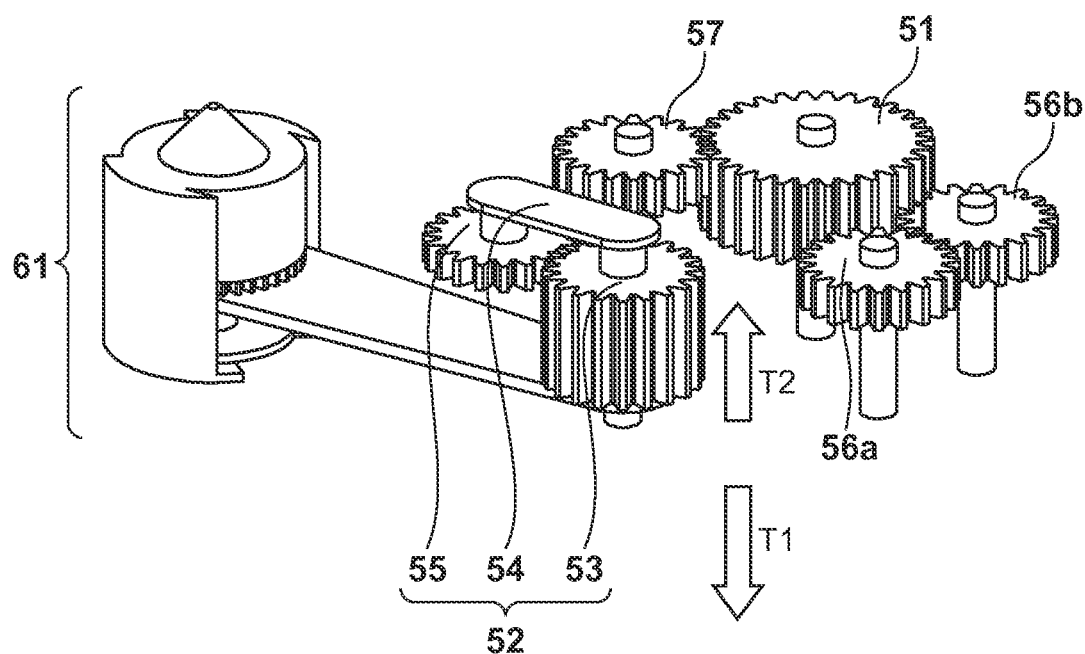
FIG. 6 is a view showing meshing switching of a planetary gear device.
Figure 7:
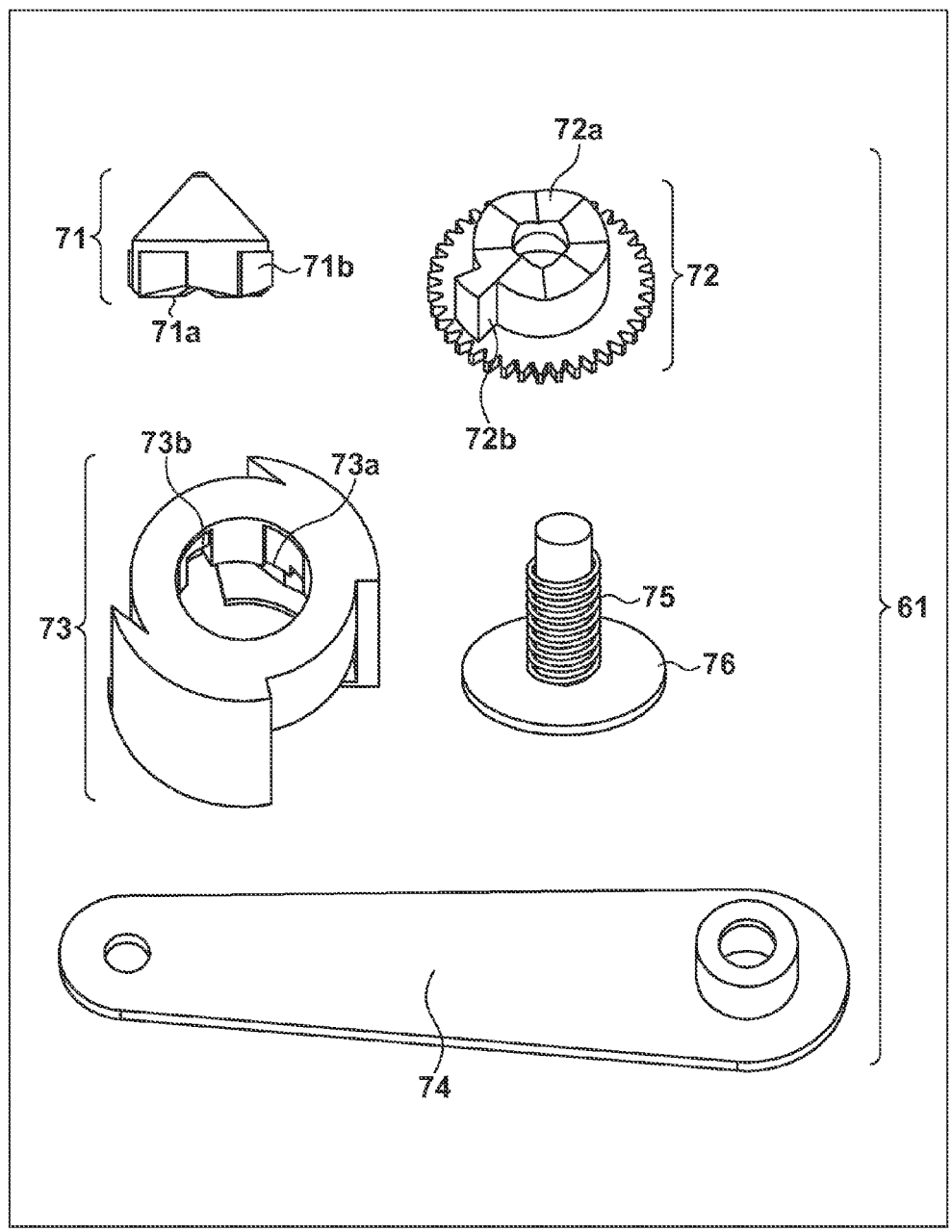
FIG. 7 is a view showing the schematic configuration of a driving switching unit.

FIG. 5 shows a driving system for the ADF unit in the image reading apparatus, FIG. 6 shows meshing switching of a planetary gear device, FIG. 7 shows each constituent portion of a driving switching unit, and FIGS. 8A to 8D show the engaged states and cam surfaces of this constituent portion, and a cam exploded view.

Referring to FIG. 5, reference numeral 45 denotes a driving input gear which meshes with the pinion gear 43 as the carrier 42 of the reading unit moves in a direction indicated by an arrow Y in FIG. 5. Reference numeral 51 denotes an ADF driving gear which transfers a driving force to the ADF unit 15 which conveys an original document. Note that the ADF driving gear 51 is configured to allow original document conveyance by meshing with a driving gear train (not shown), and transferring a driving force to the ADF unit 15.

Reference numeral 52 denotes a planetary gear device which switches the rotation output direction of the ADF driving gear 51. The planetary gear device 52 includes a sun gear 53, a planetary lever 54 rotatably, axially supported on the support shaft of the sun gear 53, and a planetary gear 55 axially supported by the planetary lever 54. Reference numeral 56a denotes a driving gear arranged to mesh with the planetary gear 55; and 57, a driving gear arranged to mesh with the planetary gear 55 and ADF driving gear 51. Reference numeral 56b denotes a driving gear arranged to mesh with the driving gear 56a and ADF driving gear 51. Reference numeral 58 denotes a driving gear unit which transfers a driving force from the driving input gear 45 to the planetary gear device 52. With this arrangement, a driving force generated by the motor is transferred from the pinion gear 43 to the driving gear 56a or driving gear 57 via the driving input gear 45, driving gear unit 58, and planetary gear device 52. The driving gear 56a transfers a driving force to the ADF driving gear 51 via the driving gear 56b, while the driving gear 57 transfers a driving force to the ADF driving gear 51.

Referring to FIG. 6, the planetary gear device 52 can reciprocally move in a direction indicated by an arrow T1 or T2 in FIG. 6 by a driving switching unit 61 (to be described later). At the position where the planetary gear device 52 has moved in the direction indicated by the arrow T1 in FIG. 6 by the driving switching unit 61 and a driving force is transferred to it, the planetary gear 55 does not mesh with the driving gear 57 in the axial direction, and changes to the state where it rotates about the axial center of the sun gear 53 to mesh with the driving gear 56a. Also, at the position where the planetary gear device 52 moves in the direction indicated by the arrow T2 in FIG. 6 from the state shown in FIG. 6 by the driving switching unit 61, the planetary gear 55 does not mesh with the driving gear 56a in the axial direction, and changes to the state, where it rotates about the axial center of the sun gear 53 to mesh with the driving gear 57.

Figure 8A:
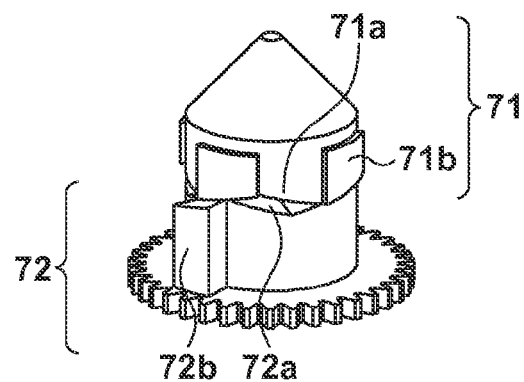
FIGS. 8A to 8D are views showing the schematic configurations of the driving switching unit.
Figure 8B:
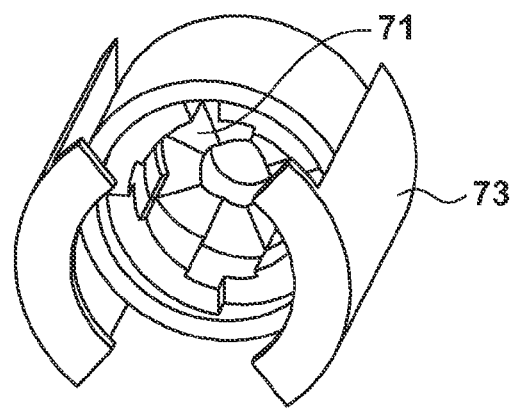
Figure 8C:
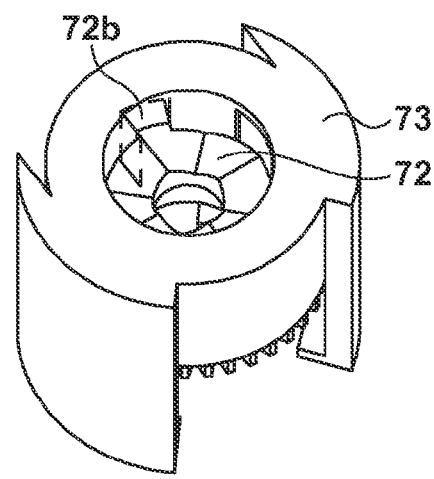

Referring to FIGS. 7 and 8A to 8D, the driving switching unit 61 includes a switch member 71, rotor 72, stator 73, lift 74, spring 75, and stopper 76. The switch member 71 has a cam surface 71a formed at the bottom of the cylindrical shape to have a pitch of 90°, and the cam surface 71a is in contact with a cam surface 72a of the rotor 72, as shown in FIG. 8A. Also, a protrusion 71b is formed on the switch member 71 to have a pitch of 90°, and guided to move rectilinearly along the axis of the cylindrical surface upon engaging with the corresponding grooved portion of the stator 73, as shown in FIG. 8B. The rotor 72 has the cam surface 72a formed at the top of the cylindrical shape to have a pitch of 90°, as shown in FIG. 7. The cam surface 72a is in contact with the switch member 71 and stator 73, and a protrusion 72b of the rotor 72 engages with the vertical wall of a cam surface 73a of the stator 73, as shown in FIGS. 8A and 8C. Further, the rotor 72 has a cylindrical side surface, and is guided to rectilinearly move along the axis of the cylindrical surface by the inner cylindrical surface of the stator 73 and to rotate about that axis. In the stator 73, the cam surface 73a which is in contact with the protrusion 72b of the rotor 72 has deep slits 73b on the cylinder axis in two portions to have a pitch of 90°, as shown in the cam exploded view of FIG. 8D, and the two slits 73*b* are adjacent to each other without facing the cam surface 73*a*.

The operations of the driving switching unit will be described with reference to FIGS. 9A to 9D.

Figure 9A:
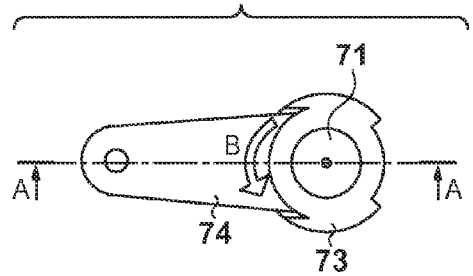
FIGS. 9A to 9D are views showing the operations of the driving switching unit.
Figure 9A:
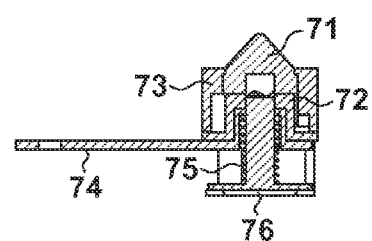

Referring to FIG. 9A, the spring 75 presses the flange portion of the lift 74 to move the lift 74 in the direction indicated by the arrow T2 in FIG. 6. With this moving process, the lift 74 presses the cylinder bottom of the rotor 72 to move it upwards, and the cam surface 72*a* of the rotor 72 presses the cam surface 71*a* of the switch member 71 to lift the switch member 71. The lifted rotor 72 stops when the vertical wall of the protrusion 72*b* has come into contact with the cam surface 73*a* of the stator 73 or the vertical wall of the slits 73*b*. Also, the switch member 71 stops when the cam surface 71*a* of the switch member 71 has come into contact with the cam surface 72*a* of the rotor 72. Note that the stopper 76 is biased downwards in a sectional view of FIG. 9A by the spring 75, but has stopped upon abutting against the locking portion of the stator 73.

Figure 9B:
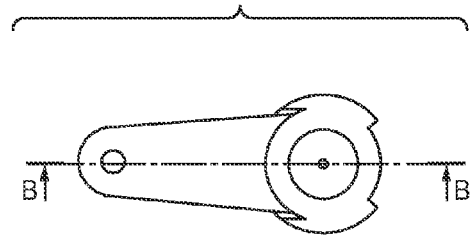
Figure 9B:
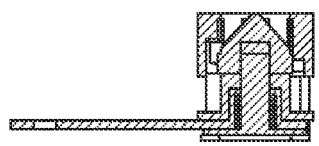

Referring to FIG. 9B, when the switch member 71 is pressed downwards in a sectional view of FIG. 9B along the axis of the cylindrical surface against the spring 75, the cam surface 71*a* of the switch member 71 presses the cam surface 72*a* of the rotor 72. Further, as the rotor 72 presses the lift 74 to gradually displace the lift 74 with respect to the stopper 76, the spring 75 is compressed. In this embodiment, the portion of the switch member 71, which projects from the upper surface of the stator 73 in sectional views of FIGS. 9A to 9D, is pressed with movement of a protrusion 42*p* on the carrier 42 (see FIGS. 11A to 11D).

Figure 9C:
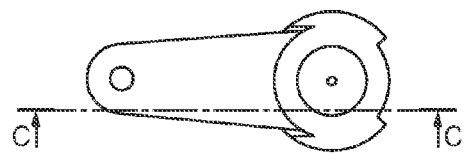
Figure 9C:
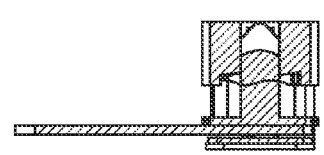

Referring to FIG. 9C, the regulation of the rotor 72 in the rotation direction about the cylinder axis by abutting of the vertical wall of the cam surface 72*a* and the wall of the slits 73*b* is canceled. The rotor 72 slidably rotates in a spiral pattern while the cam surface 72*a* of the rotor 72 is in contact with the cam surface 73*a* of the stator 73. That is, when the switch member 71 is pressed to a given position, the engagement between the rotor 72 and the stator 73 in the rotation direction about the cylinder axis by abutting of the cam surfaces is canceled, so the rotor 72 rotates in a direction indicated by an arrow B in FIG. 9C.

Figure 8D:
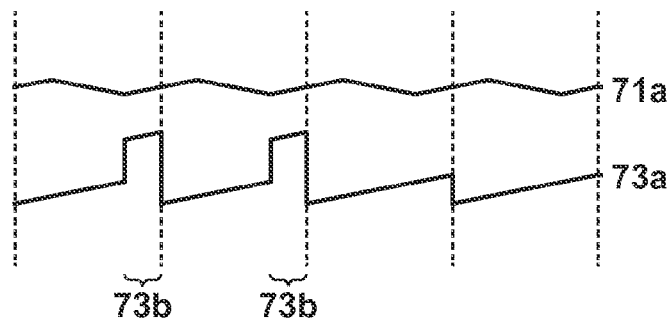
Figure 9D:
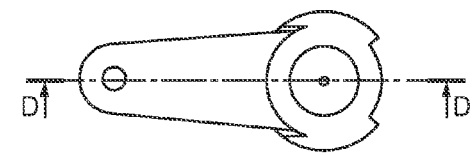
Figure 9D:
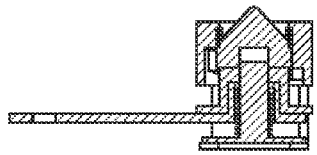

Referring to FIG. 9D, when the switch member 71 returns to the original position in the upward direction of a sectional view of FIG. 9D by the spring 75, the rotor 72 rotates, and the protrusion 72*b* of the rotor 72 stops at the position of the slit 73*b* that is 90° out of phase with the cam surface 73*a* of the stator 73. With the above-mentioned arrangement, when the driving switching unit 61 performs one reciprocal operation of the switch member 71, the rotor 72 rotates through 90° in one direction to be held on the cylinder axis by the slit portion of the stator 73. Also, since the stator 73 is held stationary on a housing 14, the planetary gear device 52 moves in the directions T1 and T2 in FIG. 9D as the lift 74 moves in the directions T1 and T2 in FIG. 9D. Note that FIGS. 9A to 9D show the operations of the driving switching unit 61 to shift the lift 74 from the direction T2 to the direction T1 in FIG. 6. As shown in FIG. 8D, since the cam surface 73*a* of the stator 73 is continuously adjacent to the slits 73*b* to have a pitch of 90°, the driving switching unit 61 allows movement from the direction T1 to the direction T1, from the direction T2 to the direction T2, and from the direction T1 to the direction T2, movement in each direction can be similarly performed by the above-mentioned operation. Also, the driving switching unit 61 switches from the direction T1 to the direction T2 and from the direction T2 to the direction T1 by pressing the switch member 71 twice, in accordance with the positional relationship between the slits 73*b*.

Figure 10A:
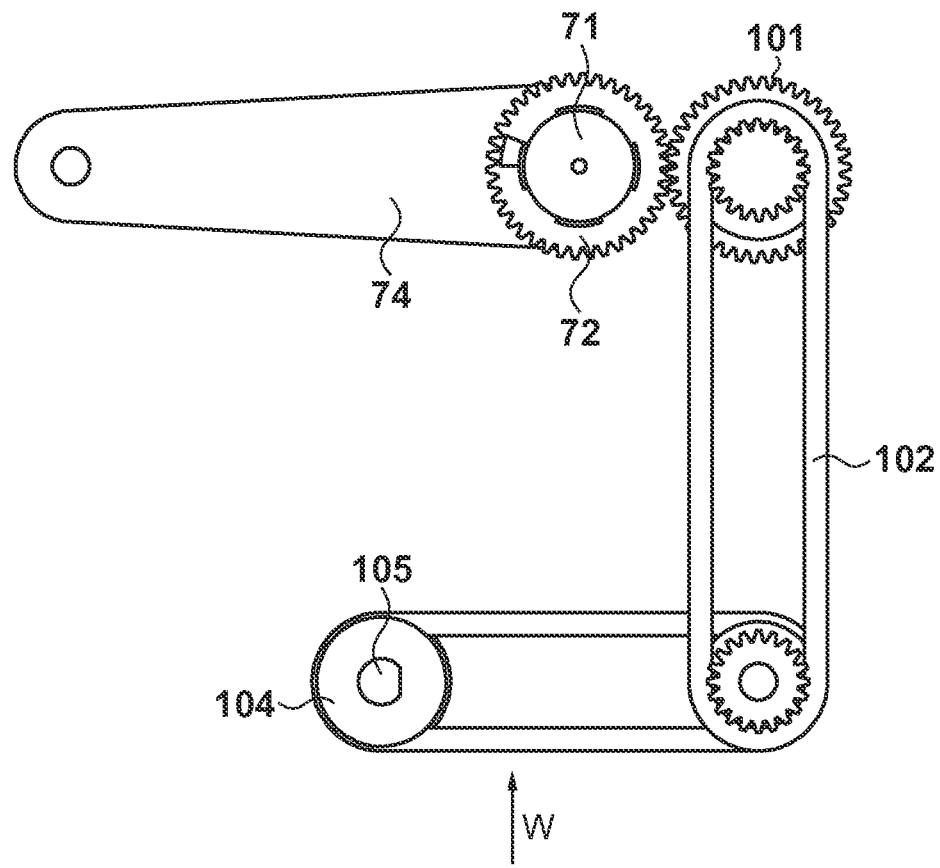
FIGS. 10A and 10B are views showing a phase recognition unit of the driving switching unit.
Figure 10B:
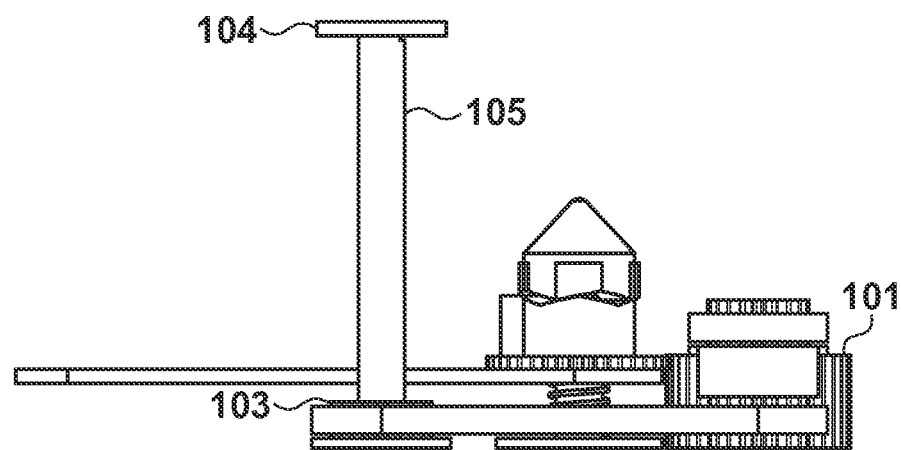

FIGS. 10A and 10B are views showing a phase recognition unit of the driving switching unit.

Referring to FIG. 10A, reference numeral 101 denotes a driving multistage gear which meshes with the driving switching unit 61. Reference numeral 102 denotes a recognition driving transfer unit which is formed by a belt and gear, and transfers a driving force from the driving multistage gear 101 to a recognition unit switching gear 103. FIG. 10B is a front view as viewed from a direction indicated by an arrow W in FIG. 10A. A shaft 105 has its one end to which a recognition unit 104 is fixed, and its other end to which the recognition unit switching gear 103 is fixed. With this arrangement, as the recognition unit switching gear 103 rotates, the recognition unit 104 also rotates synchronously. The recognition unit 104 has a pattern that can be read by the reading unit 11 (see FIGS. 11A to 11D) at a pitch of 90°, and as the phase of the rotor 72 of the driving switching unit 61 shifts through 90°, the phase of the pattern also shifts through 90° in synchronism with the rotation operation of the driving switching unit 61. The reading unit 11 reads the rotated pattern to identify the phase position of the driving switching unit 61. Also, the recognition unit 104 is interposed between the ADF position 20 and an FB reading range 24 in the reading unit 11, and the reading unit 11 reads the recognition unit 104 while moving to the ADF position 20 after the operation of the driving switching unit 61 to identify the phase of the driving switching unit 61 for each switching operation.

FIGS. 11A to 11D are views showing the reading operations in the FB and ADF modes according to this embodiment.

FIGS. 11A to 11D show part of the image reading apparatus 1 as viewed from the front (a cross-section taken along a direction indicated by an arrow Z in FIG. 5). The sequences of reading operations in the FB and ADF modes will be described below with reference to FIGS. 11A to 11D. Note that referring to FIG. 11B, the switch member 71 is located behind the stator 73, but is indicated by a solid line for the sake of easy viewing.

Figure 11A:
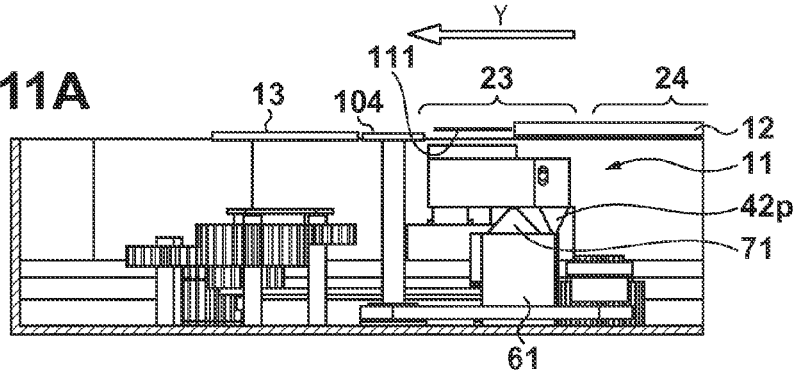
FIGS. 11A to 11D are sectional views showing reading operations in the FB and ADF modes.

In the standby state of the image reading apparatus 1, the reading unit 11 stands by at the position between the FB reading range 24 and the ADF position 20, as shown in FIG. 11A. This position will be referred to as a standby position 23 hereinafter. A reference plate 111 is provided at the position where it is opposed to the reading unit 11 at the standby position 23. The reference plate 111 is a sheet for correcting the position of the reading unit 11 in the moving direction, or performing color correction in processing a read image.

The sequence of a reading operation in the FB mode will be described first.

When an original document is placed on the platen glass 12 serving as a platen, and the reading start key of the operation unit 3 is pressed, or a reading start command is received from an external system (not shown) such as a personal computer, the reading unit 11 reads an image on the reference plate 111. The motor 41 is driven to move the reading unit 11 in a direction opposite to an arrow Y in FIGS. 11A to 11D. When the reading unit 11 reaches the FB reading range 24 of the platen glass 12, it scans an original document with further movement. Note that the rotation direction of the motor 41 when the reading unit 11 is moved in the direction opposite to the arrow Y in FIGS. 11A to 11D is defined as forward rotation for the sake of convenience. When the motor 41 rotates in the forward direction, the pinion gear 43 rotates clockwise in FIG. 5, and allows the carrier 42, that is, the reading unit 11 to move in the direction opposite to the arrow Y in FIG. 5 as it meshes with the rail rack 44. When the motor 41 rotates in the reverse direction, an operation opposite to the above case is done to allow the reading unit 11 to move in the direction indicated by the arrow Y in FIG. 5. At the end of reading of a predetermined reading length, the motor 41 stops its forward rotation to stop the movement of the reading unit 11. After the end of reading, the motor 41 rotates in the reverse direction to move the reading unit 11 in the direction indicated by the arrow Y in FIG. 5, and the reading unit 11 stops and assumes a standby state upon returning to the standby position 23.

The sequence of a reading operation in the ADF mode will be described next.

Figure 11B:
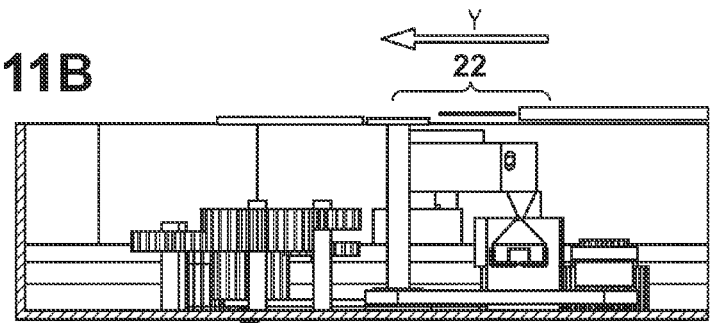
Figure 11C:
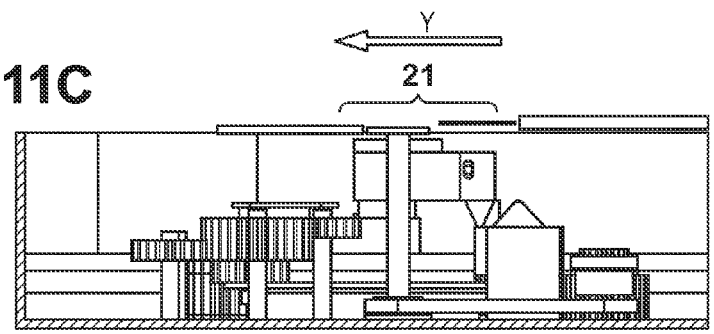
Figure 11D:
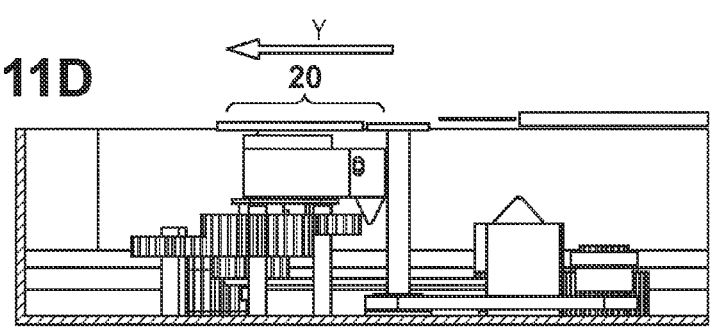

When an original document is set on an original document tray (not shown) of the ADF unit 15, an original document detection sensor (not shown) detects the original document. When the reading start key of the operation unit 3 is pressed, or a reading start command is received from an external system (not shown) such as a personal computer, the reading unit 11 moves in the Y-direction in FIGS. 11A to 11D after reading of the reference plate 111, so the protrusion 42p provided on the carrier 42 presses the switch member 71 of the driving switching unit 61. The position of the reading unit 11 in this state will be referred to as a switching position 22 hereinafter (FIG. 11B). After the carrier 42 presses the switch member 71, and the motor 41 is set in a noncontact state with the switch member 71, the pattern of the recognition unit 104 is read. The position of the reading unit 11 in this state will be referred to as a recognition position 21 hereinafter (FIG. 11C). At this time, when the phase of the driving switching unit 61 is determined to be equivalent to the rotation direction intended by the ADF unit 15 from the pattern of the recognition unit 104, the motor 41 rotates in the reverse direction to move the reading unit 11 in the direction indicated by the arrow Y in FIGS. 11A to 11D, that is, toward the ADF position 20. When the reading unit 11 reaches the ADF position 20, the pinion gear 43 is released from meshing with the rail rack 44 and meshes with the driving input gear 45. When the motor rotates further in the reverse direction, a driving force is transferred to the drive train joint portion of an ADF original document conveyance unit (not shown) via the ADF driving gear 51 and the driving gears 56a and 56b or driving gear 57. At this time, the rotation direction of a driving force changes depending on whether the planetary gear 55 uses the driving gears 56a and 56b or the driving gear 57 as a mediacy, and this makes it possible to transfer driving forces for both forward rotation and reverse rotation to the ADF unit (FIG. 11D).

To change the rotation direction in original document conveyance of the ADF unit, the motor 41 of the reading unit 11 set at the ADF position 20 is driven to rotate in the forward direction. The reading unit 11 is moved in the direction opposite to the arrow Y in FIGS. 11A to 11D to press the switch member 71 at the switching position 22. After being set in a noncontact state with the switch member 71, the forward rotation of the motor 41 is stopped at its standby position 23 and the motor 41 is rotated in the reverse direction to move the reading unit 11 in the direction indicated by the arrow Y in FIGS. 11A to 11D, that is, toward the ADF position 20. After the switch member 71 is pressed at the switching position 22 during movement toward the ADF position 20, and the motor 41 is set in a noncontact state with the switch member 71, the reading unit 11 reads the pattern of the recognition unit 104 at the recognition position 21 to confirm the phase of the driving switching unit 61. After the end of original document conveyance, the motor 41 is driven to rotate in the forward direction to move the reading unit 11 toward the standby position 23. Further, the reading unit 11 is moved in the Y-direction, as described earlier, from the standby position 23 to read the pattern of the recognition unit 104, and, if the rotation direction is the same as that at the start of reading in the ADF mode, the motor 41 is stopped to end reading in the ADF mode. However, if the rotation direction is different from that at the start of reading in the ADF mode, a driving switching sequence is executed, the reading unit 11 is moved to the standby position 23, and the motor 41 is stopped to end reading in the ADF mode. Note that if the rotation direction intended by the ADF unit 15 is not obtained in reading the pattern of the recognition unit 104, it can be changed to a desired driving direction by an operation of pressing the switch member 71 using the protrusion 42p on the carrier 42.

With the above-mentioned arrangement, a driving force can be transferred in an arbitrary rotation direction in the FB and ADF modes in accordance with the moving amount and direction of the reading unit 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-161960, filed Jul. 20, 2012, which is hereby incorporated by reference herein in its entirety.

What is claimed is:

1. An image reading apparatus comprising:
a movably arranged reading unit including a movable sensor;
a first reading mechanism which moves said reading unit to read an original placed on a platen;
a second reading mechanism which conveys the original relative to said reading unit to read the original;
a common driving source which drives said first reading mechanism and said second reading mechanism;
a transfer unit which transfers a driving force from said common driving source to said first reading mechanism and to said second reading mechanism; and
a switching unit which switches rotation of said second reading mechanism from forward rotation to reverse rotation without changing rotation direction of said common driving source, said switching unit being operated by movement of said reading unit.

2. The apparatus according to claim 1, wherein said switching unit is operated in accordance with a moving amount and a moving direction of said reading unit.

3. The apparatus according to claim 1, further comprising a recognition unit which is switched by said switching unit, said recognition unit being read by said reading unit to identify the forward rotation and the reverse rotation of said second reading mechanism.

4. The apparatus according to claim 3, wherein said recognition unit is disposed between a position of said reading unit when said reading unit operates said switching unit, and a position of said reading unit when the original is conveyed and read.

5. The apparatus according to claim 1, wherein a reference plate configured to correct a position of said reading unit in a moving direction, or to perform color correction in processing a read image, is disposed between a position of said reading unit when said reading unit is moved to read the original, and a position of said reading unit when the original is conveyed and read.

6. The apparatus according to claim 1, wherein the switching unit switches the rotation direction of said second reading mechanism when said reading unit contacts said switching unit.

7. The apparatus according to claim 1, wherein the switching unit switches the rotation direction of said second reading mechanism when said reading unit pushes a part of said switching unit.

8. The apparatus according to claim 1, wherein the switching unit switches the rotation direction of said second reading mechanism when said reading unit passes through said switching unit in opposite direction.

9. The apparatus according to claim 1, wherein said transfer unit transfers a driving force of said common driving source to said second reading mechanism and the switching unit switches the rotation direction of said second reading mechanism by changing a transfer route of the driving force to said second reading mechanism.

10. The apparatus according to claim 1, wherein the switching unit switches the rotation direction from the reverse rotation to the forward rotation.

\* \* \* \* \*